(12) United States Patent
Morinaga et al.

(10) Patent No.: US 9,321,476 B2
(45) Date of Patent: Apr. 26, 2016

(54) STEERING APPARATUS FOR A VEHICLE

(71) Applicant: AISIN SEIKI KABUSHIKI KAISHA, Kariya-shi (JP)

(72) Inventors: Shinya Morinaga, Kariya (JP); Yasuaki Kurokawa, Nagoya (JP); Takeshi Marutani, Nishio (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/376,476

(22) PCT Filed: Dec. 25, 2012

(86) PCT No.: PCT/JP2012/083378
§ 371 (c)(1),
(2) Date: Aug. 4, 2014

(87) PCT Pub. No.: WO2013/118412
PCT Pub. Date: Aug. 15, 2013

(65) Prior Publication Data
US 2015/0061271 A1    Mar. 5, 2015

(30) Foreign Application Priority Data
Feb. 10, 2012    (JP) .................. 2012-027786

(51) Int. Cl.
  *B62D 1/181*    (2006.01)
  *B62D 1/187*    (2006.01)
  *B62D 1/189*    (2006.01)
(52) U.S. Cl.
  CPC ............. *B62D 1/181* (2013.01); *B62D 1/187* (2013.01); *B62D 1/189* (2013.01)

(58) Field of Classification Search
  CPC ......... B62D 1/181; B62D 1/187; B62D 1/189
  See application file for complete search history.

(56) References Cited

U.S. PATENT DOCUMENTS 4,752,085 A     6/1988  Yamamoto
5,049,364 A *   9/1991  Yoshimoto et al. ........ 423/239.1
(Continued)

FOREIGN PATENT DOCUMENTS

DE    693 03 138 T2    10/1996
JP    H05-147539 A      6/1993
(Continued)

OTHER PUBLICATIONS

International Search Report (PCT/ISA/210) mailed on Mar. 19, 2013, by the Japanese Patent Office as the International Searching Authority for International Application No. PCT/JP2012/083378.
(Continued)

*Primary Examiner* — Ruth Ilan
(74) *Attorney, Agent, or Firm* — Buchanan Ingersoll & Rooney PC

(57) ABSTRACT

A steering apparatus is provided for reducing its size by reducing a load applied to a driving unit, and configuring an electrically operated tilt mechanism which is small in size and easily mounted on a vehicle. A driving unit adjusting a relative position of a steering column to a fixing bracket, and a biasing member (e.g., tension coil spring) having one end supported on the fixing bracket, and holding the steering column at a predetermined neutral position when the driving unit is not actuated, are provided, so that the driving unit adjusts the steering column to be placed at a tilt position with a desired tilt angle relative to the fixing bracket.

4 Claims, 7 Drawing Sheets

(56) References Cited

U.S. PATENT DOCUMENTS

| | | | |
|---|---|---|---|
| 5,477,744 A | 12/1995 | Hoblingre et al. | |
| 8,979,126 B2 * | 3/2015 | Morinaga et al. | 280/775 |
| 2003/0164608 A1 | 9/2003 | Morita et al. | |
| 2004/0023746 A1 * | 2/2004 | Arihara | 475/280 |
| 2006/0266151 A1 * | 11/2006 | Avers et al. | 74/492 |
| 2009/0066070 A1 * | 3/2009 | Ueno et al. | 280/775 |
| 2013/0255430 A1 * | 10/2013 | Moriyama et al. | 74/493 |

FOREIGN PATENT DOCUMENTS

| | | |
|---|---|---|
| JP | 2000-166267 A | 6/2000 |
| JP | 2003-048546 A | 2/2003 |
| JP | 2006-264547 A | 10/2006 |
| JP | 2006-327374 A | 12/2006 |
| JP | 2010-000840 A | 1/2010 |
| JP | 2011-042274 A | 3/2011 |

OTHER PUBLICATIONS

Official Action issued Oct. 15, 2015 in corresponding German Patent Application No. 11 2012 005 851.8, together with an English translation (10 pages).

* cited by examiner

STEERING APPARATUS FOR A VEHICLE

TECHNICAL FIELD

The present invention relates to a steering apparatus for a vehicle, and particularly to the steering apparatus for supporting a steering column on a vehicle body to be swingable and adjusting it to be placed at a desired tilt position.

BACKGROUND ART

As a mechanism for adjusting an operative position of a steering wheel to be placed at a desired tilt position, an electrically operated tilt mechanism is known. For example, in the following Patent document 1, it is aimed "to provide a steering apparatus to be capable of suppressing backlash in a vertical direction without affecting a tilting operation" (described in Paragraph [0004] of the Patent document 1), and "in a steering apparatus comprising a steering shaft connected to a steering wheel, a steering column having a cylindrical column housing receiving and supporting the steering shaft rotatably, and fixed to a vehicle body by a fixing bracket, and a tilt mechanism adjusting tilted amount of the steering column relative to the fixing bracket based on operation of a tilt motor, the tilt mechanism comprises a shaft rotated by the tilt motor, a slide member sliding on the shaft based on rotation of the shaft, and a link mechanism connecting the column housing to the slide member and the fixing bracket, and tilting the column housing relative to the fixing bracket based on sliding of the slide member, wherein the link mechanism is placed on both of left and right sides of the column housing at the outer side in the radial direction of the column housing" is proposed (described in Paragraph [0005] of the same).

Also, in the following Patent document 2, it is aimed "to provide a steering apparatus to be capable of commonly providing a steering column regardless of a driving system of a tilt-telescopic mechanism" (described in Paragraph [0005] of Patent document 2), and "in a steering apparatus comprising a steering shaft installed with a steering wheel, a steering column receiving and supporting the steering shaft rotatably, and a bracket for installing a steering position adjusting mechanism on the steering column, the steering column is configured to be attachable to and detachable from the steering column" is proposed (described in Paragraph [0006] of the same). Furthermore, "the bracket is a support bracket for installing a manually operated tilt-telescopic mechanism or a base bracket for installing an electrically operated tilt-telescopic mechanism" is described (in Paragraph [0007] of the same), and "installing portions of the support bracket and the installing portion of the base bracket are to be commonly provided" is described (in Paragraph [0009] of the same).

PRIOR ART DOCUMENT

Patent Document

Patent Document 1:
Japanese Patent Laid-open Publication No. 2006-327374
Patent Document 2:
Japanese Patent Laid-open Publication No. 2006-264547

SUMMARY OF THE INVENTION

Problems to be Solved by the Invention

The tilt steering apparatus as disclosed in the above Patent document 1 is configured to transform an output of the tilt motor (electric motor) into a linear motion by the slide mechanism using the screw shaft (trapezoidal screw or the like), and transform it into a vertical displacement (tilting motion) of the steering wheel by means of the link mechanism using a bell crank, and the electrically operated tilt mechanism comprises a lot of parts such as the electric motor configuring the driving unit, link mechanism and the like, and it is large in size, so that it is difficult to install it on a vehicle.

On the other hand, according to the steering apparatus as disclosed in the above Patent document 2, it is proposed to commonly provide a bracket installing portion for the manually operated tilt mechanism and the electrically operated tilt mechanism. However, the electrically operated tilt mechanism is large like prior ones, so that it is difficult to install it on a vehicle.

Therefore, according to the present invention, in a steering apparatus for adjusting a steering column to be placed at a desired tilt position, it is an object to provide the steering apparatus which is aimed to reduce its size by reducing a load applied to a driving unit, and capable of configuring an electrically operated tilt mechanism which is small in size and easily mounted on a vehicle.

Means for Solving the Problems

To solve the above-described problems, according to the present invention, a steering apparatus for a vehicle comprises a fixing bracket fixed to a vehicle body, a steering column supported on the vehicle body to be swingable, a driving unit adjusting a relative position of the steering column to the fixing bracket, and a biasing member having one end supported on the fixing bracket, and holding the steering column at a predetermined neutral position when the driving unit is not actuated, and it is configured so as to adjust the steering column to be placed at a tilt position with a desired tilt angle relative to the fixing bracket.

The biasing member may be configured by a coil spring with one end thereof being engaged with the fixing bracket, and the other end thereof being engaged with the steering column. As for the coil spring, a tension coil spring and a torsion coil spring are included, and for example, the biasing member can be configured by a pair of tension coil springs, or a torsion coil spring of double torsion type.

In the steering apparatus as described above, it may further comprise a tilt bracket holding the steering column and supported on the fixing bracket to be relatively movable thereto, and a tilt shaft extending in a lateral direction of the vehicle body and supported on the fixing bracket to be relatively movable thereto in an axial direction of the steering column, wherein the driving unit comprises a crank member having one end fixed to the tilt shaft, an electric motor fixed to the tilt bracket, and a speed reducer reducing an output of the electric motor and rotating the other end of the crank member, and wherein the tilt bracket is rotated about an axis of the tilt shaft in response to rotation of the electric motor, to adjust a relative position of the tilt bracket to the fixing bracket. In this case, the biasing member may be configured by a coil spring with one end thereof being engaged with the fixing bracket, and with the other end thereof being engaged with at least one of the tilt bracket and the steering column, and for example, a pair of tension coil springs disposed at both of left and right sides of the vehicle body, or a torsion coil spring of double torsion type may be employed.

In the steering apparatus as described above, the fixing bracket may be formed with elongated holes having longer dimensions thereof extending in the axial direction of the steering column, and the tilt shaft may be configured to be supported in the elongated holes to be relatively movable thereto.

The speed reducer may comprise a first worm gear fixed to an output shaft of the electric motor, a first worm wheel meshed with the first worm gear, a second worm gear rotated integrally with the first worm wheel, and a second worm wheel meshed with the second worm gear, and a rotation shaft of the second worm wheel may be configured to be fixed to the other end of the crank member.

Effects of the Invention

As the present invention has been configured as described above, the following effects are achieved. That is, according to the steering apparatus of the present invention, a fixing bracket fixed to a vehicle body, a steering column supported on the vehicle body to be swingable, a driving unit adjusting a relative position of the steering column to the fixing bracket, and a biasing member having one end supported on the fixing bracket, and holding the steering column at a predetermined neutral position when the driving unit is not actuated, are provided, so that the load to the driving unit can be largely reduced by the biasing member. That is, when the driving unit is not actuated, the steering column is held at the predetermined neutral position, and it is sufficient that the driving unit can output such a driving force required to move it from the neutral position to the tilt-up side or tilt-down side, so that the load to the driving unit can be largely reduced. Therefore, minimization of the driving unit can be made, and the electrically operated tilt mechanism which is small in size and easily mounted on the vehicle can be configured.

As for the biasing member as described above, if the coil spring with one end thereof being engaged with the fixing bracket, and the other end thereof being engaged with the steering column, is employed, minimization of the driving unit can be made by a simple and inexpensive configuration. For example, the biasing member may be configured by the tension coil spring or torsion coil spring, so that a pair of tension coil springs may be placed symmetrically in the lateral direction of the vehicle body, or a torsion coil spring of double torsion type may be installed.

According to the apparatus comprising the tilt bracket, tilt shaft and driving unit as configured above, and configured to rotate the tilt bracket about the axis of the tilt shaft, and adjust the relative position of the tilt bracket to the fixing bracket, if the driving unit is provided with the crank member, electric motor and speed reducer, and configured to reduce the output of the electric motor and rotate the crank member, an electrically operated tilt mechanism, which is small in size, simple and easily assembled, can be configured with a small number of parts without requiring the prior slide mechanism or link mechanism. For example, if parts configuring a manually operated tilt mechanism are installed on the same fixing bracket as the above-described one fixed to the steering column and the tilt bracket, a steering apparatus having a manually operated tilt mechanism can be provided simply and easily.

In addition, when the driving unit is not actuated, the steering column is held at the predetermined neutral position, and it is sufficient that the driving unit can output such a driving force required to move it from the neutral position to the tilt-up side or tilt-down side, as described above, so that the load to the driving unit can be largely reduced. Therefore, minimization of the driving unit can be made, and an electrically operated tilt mechanism which is small in size and easily mounted on a vehicle can be provided. In this case, the biasing member may be configured by a coil spring with one end thereof being engaged with the fixing bracket and the other end thereof being engaged with at least one of the tilt bracket and steering column, and may be configured only by a torsion coil spring of double torsion type, for example.

Furthermore, if the fixing bracket is formed with elongated holes, and the tilt shaft is configured to be supported in the elongated holes to be relatively movable thereto, the apparatus as a whole can be made simple and inexpensive.

As for the speed reducer, if it comprises the first and second worm gears, and first and second worm wheels, and if the rotation shaft of the second worm wheel is configured to be fixed to the other end of the crank member, such an appropriate apparatus can be provided that a reverse efficiency can be made as small as possible.

EMBODIMENTS FOR CARRYING OUT THE INVENTION

Figure 1:
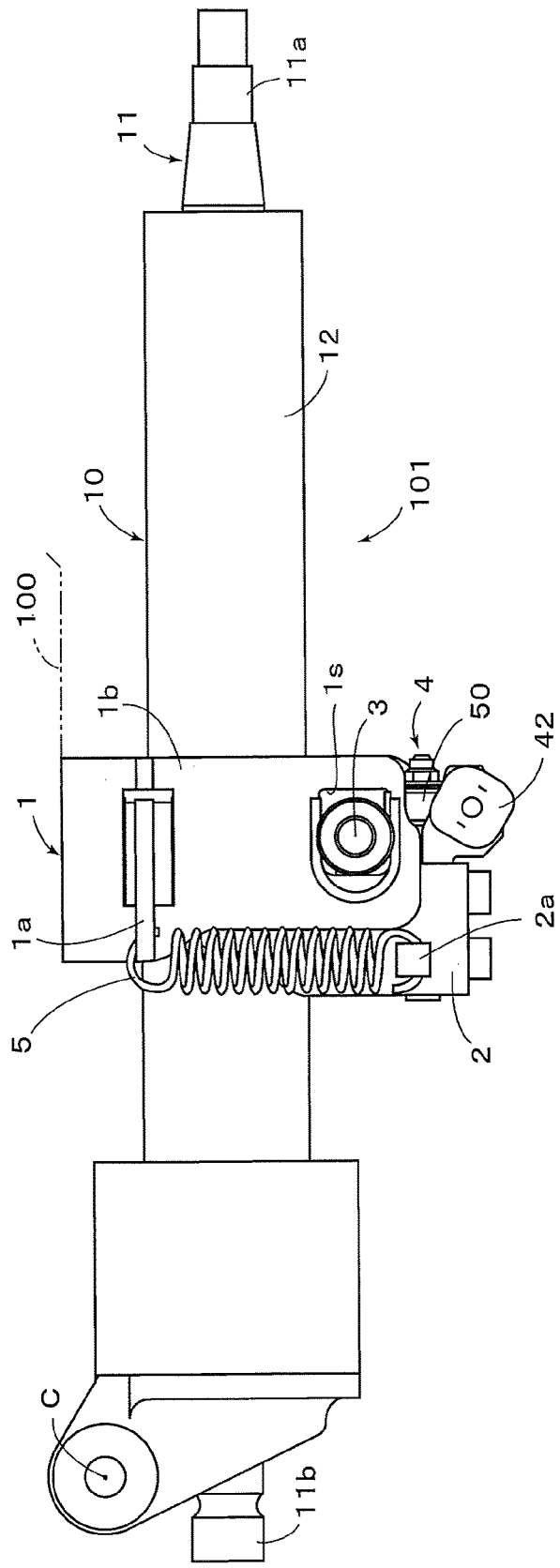
FIG. 1 is a side view of a steering apparatus according to an embodiment of the present invention.

Hereinafter, will be explained desirable embodiments of the present invention referring to drawings. FIGS. 1-4 show a configuration of a steering apparatus 101 according to an embodiment of the present invention, wherein a steering column 10 is supported on a vehicle body 100 to be swingable, and it is configured such that the steering column 10 can be adjusted to be placed at a tilt position with a desired tilt angle relative to a fixing bracket 1. As for a structure for supporting the steering column 10 on the vehicle body 100, a tilt bracket 2 is supported on the fixing bracket 1 fixed to the vehicle body 100 to be relatively movable thereto. A middle portion of the steering column 10 is held by the tilt bracket 2, and supported to be swingable about a swinging center (C) provided at a front part of the vehicle body 100.

The steering column 10 has a steering shaft 11 and a main tube 12 placed on a common axis so as to enclose the steering shaft 11. A steering wheel (not shown) is supported on a rear end of the steering shaft 11, a front end of which is connected to a steering mechanism (not shown). The steering shaft 11 has a cylindrical upper shaft 11*a*, a rear end of which is connected to the steering wheel (not shown), and a lower shaft 11*b* which is connected to a front end of the upper shaft 11*a*. That is, the upper shaft 11*a* and the lower shaft 11*b* are connected to be relatively movable in an axial direction, and the front end of the lower shaft 11*b* is connected to the steering mechanism (not shown), which is actuated in response to operation of the steering wheel so as to steer wheels to be steered (not shown) through a wheel steering mechanism (not shown).

Figure 2:
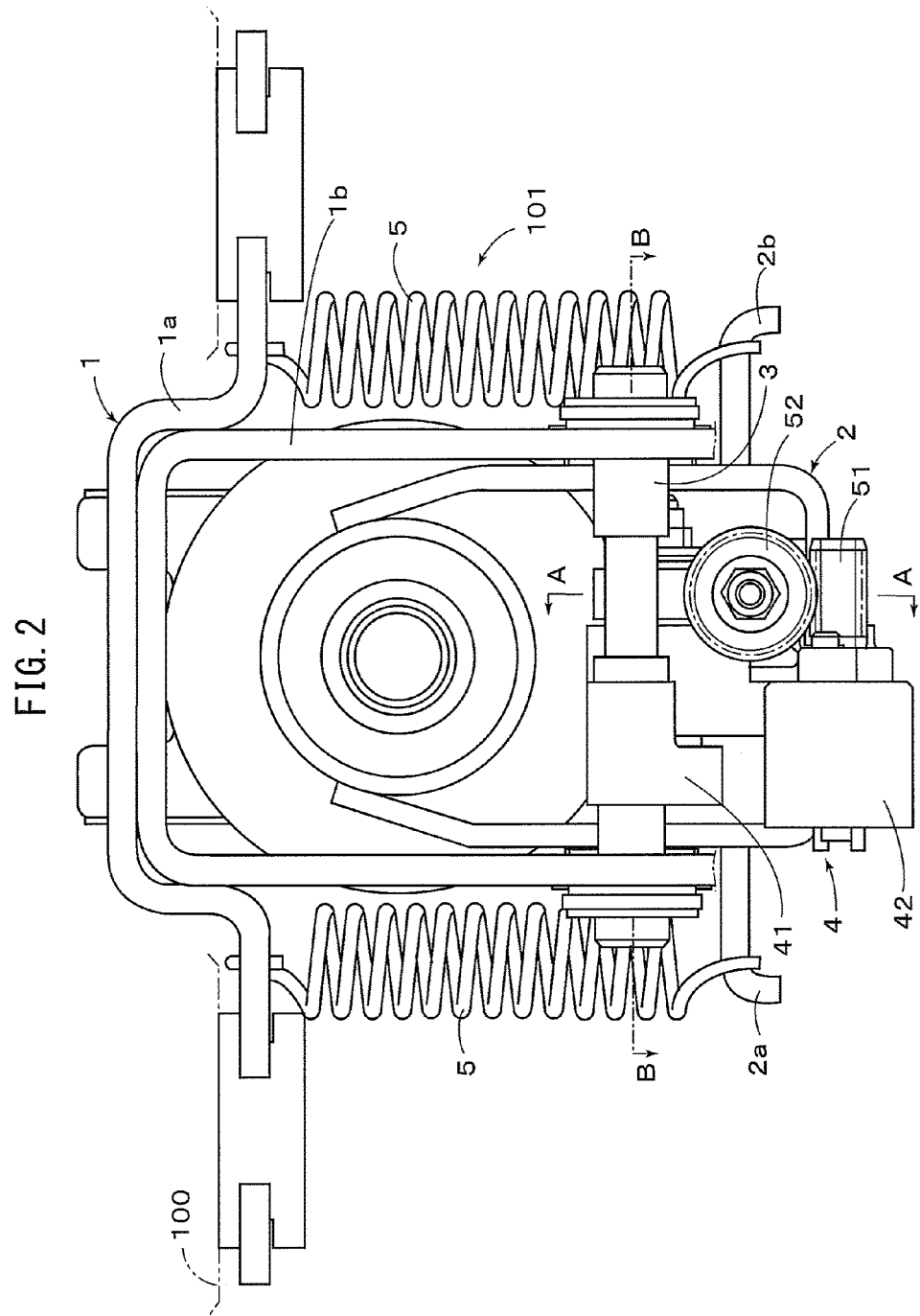
FIG. 2 is a front view of a steering apparatus according to an embodiment of the present invention.

The fixing bracket 1 comprises an upper bracket 1*a* having connecting portions to the vehicle body as shown in FIG. 2, and a U-shaped lower bracket 1*b* connected with the upper bracket 1*a* (by welding, for example). Also, the tilt bracket 2 is formed in a U-shape, opposite ends of which are fixed to the middle portion of the steering column 10 (by welding, for example). On the tilt bracket 2, a tilt shaft 3 is supported so as to extend in a lateral direction of the vehicle body 100. The fixing bracket 1 is formed with elongated holes (one of which is indicated by "1*s*" in FIG. 1) having longer dimensions (elongated dimensions) in the axial direction of the steering column 10, on opposite side walls of the lower bracket 1*b*, respectively. The tilt shaft 3 is disposed to penetrate through the elongated holes is in the lateral direction of the vehicle body 100, so that the tilt shaft 3 is supported on the fixing bracket 1 so as to be relatively movable thereto in the axial direction of the steering column 10. In the case where there are clearances between the elongated holes is and tilt shaft 3, it may cause looseness on the steering wheel (not shown). Therefore, the clearances should be made as small as possible, or dimensions may be set to provide an interference in advance.

Then, the driving unit 4 of the present embodiment is placed inside of the U-shaped tilt bracket 2, and fixed to the tilt bracket 2 by screws or the like. The driving unit 4 is provided for rotating the tilt bracket 2 about the axis of the tilt shaft 3 so as to adjust a relative position of the tilt bracket 2 to the fixing bracket 1. And, it is provided with a crank member 41 having one end fixed to the tilt shaft 3, an electric motor 42 fixed to the tilt bracket 2, and a speed reducer 50 which reduces a speed of an output of the electric motor 42 and rotates the other end of the crank member 41.

Furthermore, one ends of a pair of tension coil springs (represented by 5) are engaged with the opposite ends of the upper bracket 1*a* of the fixing bracket 1, and the other ends of them are engaged with the tilt bracket 2. That is, as illustrated in FIG. 2 with a lower end of the lower bracket 1*b* being cut, engaging protuberances 2*a*, 2*b* are provided on opposite side walls of the tilt bracket 2, and engaged with the other ends of the tension coil springs 5. The engaging protuberances 2*a*, 2*b* may be made integrally with the tilt bracket 2 by cutting and bending or the like, or may be made separately from the tilt bracket 2 and fixed thereto by welding or the like. The other ends of the tension coil springs 5 may be directly engaged with the steering column 10 (e.g., opposite side walls of the main tube 12). According to the present embodiment, therefore, the biasing member is configured by the pair of the tension coil springs 5, so as to bias the steering column 10 to be held at a predetermined neutral position (tilt neutral position) when the driving unit 4 is not actuated.

Figure 3:
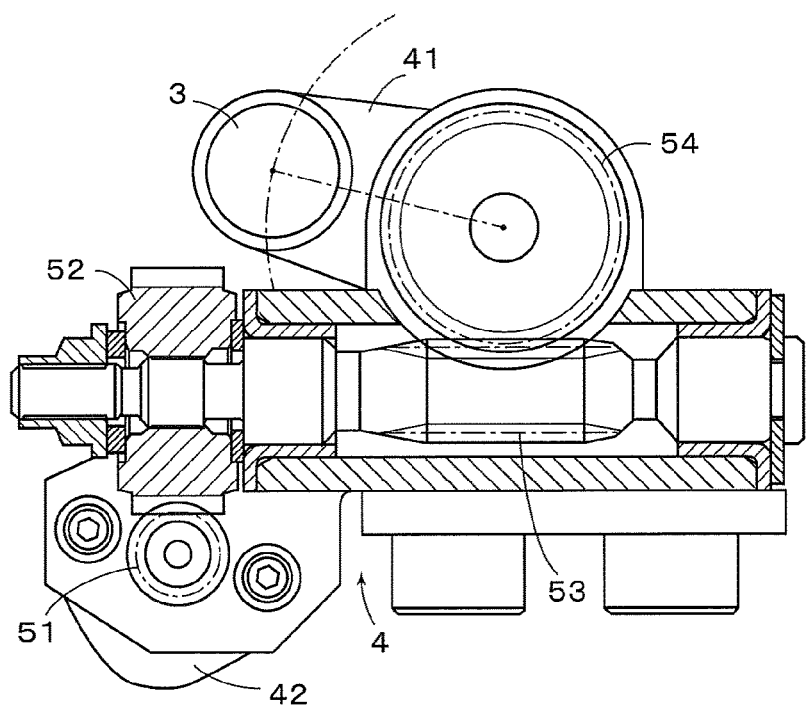
FIG. 3 is a sectional view sectioned along A-A line in FIG. 2 to show a driving unit provided for an embodiment of the present invention.

The speed reducer 50 of the present embodiment is designed to reduce a reverse efficiency as small as possible so as to be capable of holding a tilt position in accordance with an input of the steering wheel, in order to prevent such a tilt position change that a vehicle driver does not intend from being caused by a load input to the steering wheel (not shown). That is, as shown in FIG. 3, a first phase speed reducing mechanism is configured by a first worm gear 51 fixed to an output shaft of the electric motor 42 and a first worm wheel 52 meshed with the first worm gear 51, and a second phase speed reducing mechanism is configured by a second worm gear 53 rotated integrally with the first worm wheel 52, and a second worm wheel 54 meshed with the second worm gear 53. The first worm wheel 52 and the second worm gear 53 are connected by a spline-connection, for example, thereby to be rotated integrally. Although it is so designed that the rotation output of the electric motor 42 is reduced by the two-phase speed reducing mechanism, a single phase thereof or three-phase thereof may be employed.

Figure 4:
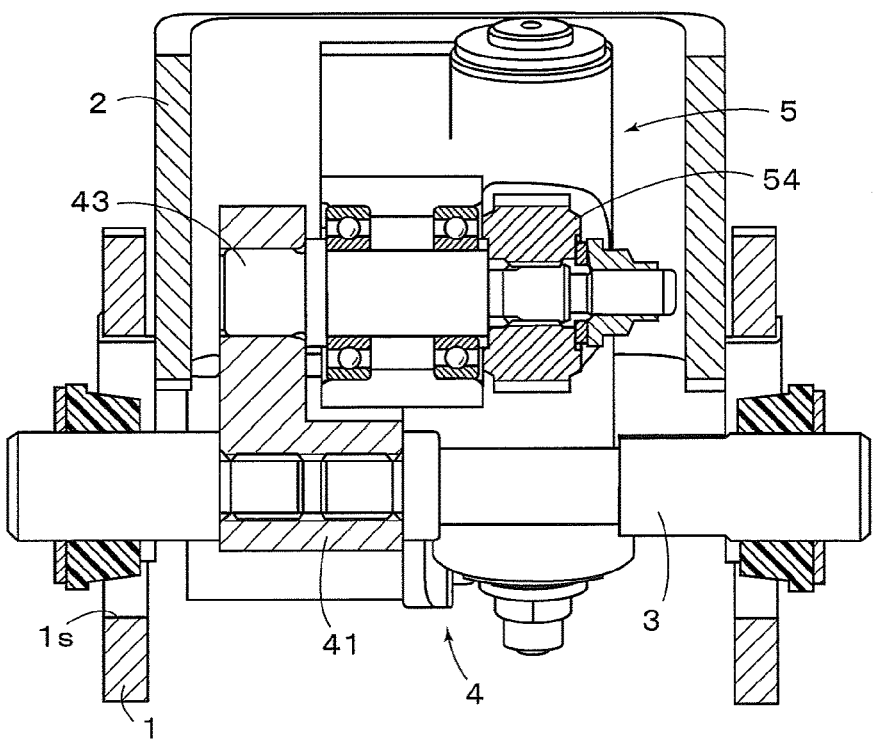
FIG. 4 is a sectional view sectioned along B-B line in FIG. 2 to show a driving unit provided for an embodiment of the present invention.

And, as shown in FIG. 4, an axial portion of the second worm wheel 54 is connected to one end of a crank rotation shaft 43, the other end of which is connected to the other end of the crank member 41. Therefore, when the electric motor 42 is rotated, the crank member 41 swings about the rotation shaft of the second worm wheel 54. As for connecting means at opposite ends of the crank member 41, any of welding, press-fitting, meshing and the like may be employed, provided that its one end is fixed to the tilt shaft 3 and the other end is fixed to the crank rotation shaft 43.

Figure 5:
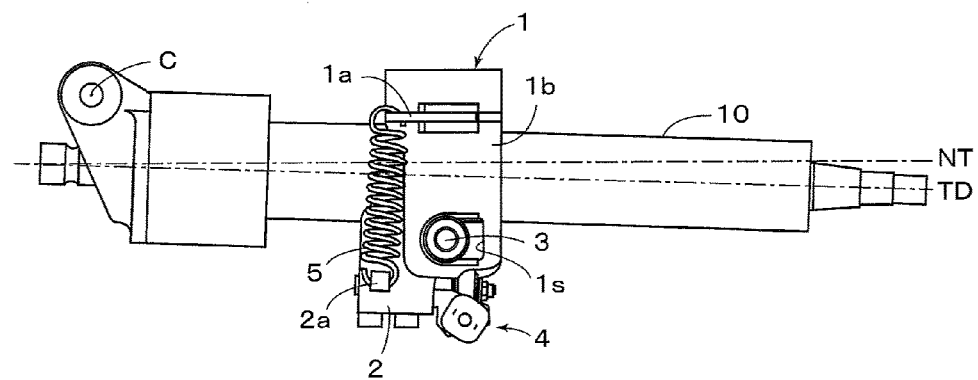
FIG. 5 is a side view of a steering apparatus according to an embodiment of the present invention to be placed at a tilt-down position.
Figure 6:
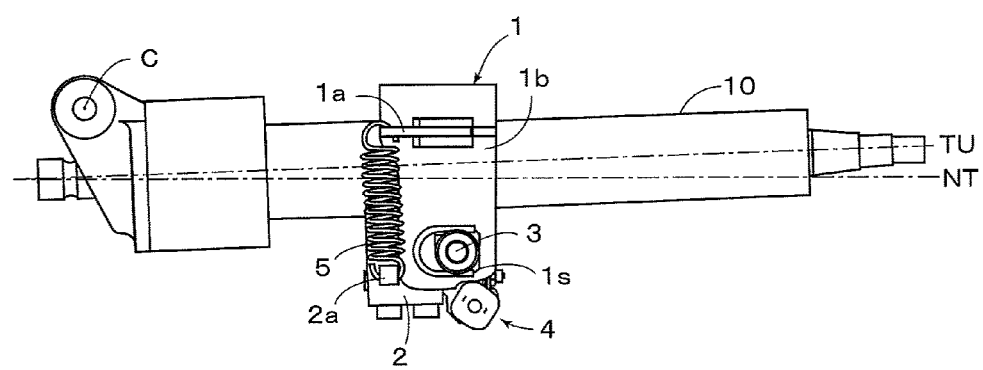
FIG. 6 is a side view of a steering apparatus according to an embodiment of the present invention to be placed at a tilt-up position.

As the driving unit 4 of the present embodiment is configured as described above, when the electric motor 42 is rotated, its rotational speed is appropriately reduced by the speed reducer 50, and transmitted to the crank member 41, so that the crank member 41 is rotated (swung). Since the tilt shaft 3 is connected to the vehicle body 100 through the fixing bracket 1, the driving unit 4 as a whole is rotated (swung) about the axis of the tilt shaft 3. And, since the driving unit 4 is secured to the tilt bracket 2, the tilt bracket 2 is rotated about the axis of the tilt shaft 3, too. As a result, the steering column 10 integrally connected to the tilt bracket 2 swings about the swinging center (C), so that a tilting operation will be achieved as shown in FIGS. 5 and 6. Consequently, a relative position of the tilt bracket 2 to the fixing bracket 1 is adjusted to place the steering column 10 at a desired tilt position. In FIGS. 5 and 6, "NT" indicates a neutral position (tilt-neutral position), "TD" indicates a tilt-down position, and "TU" indicates a tilt-up position.

In the tilting operation as described above, since the swinging center of the crank member 41 (integral with the tilt shaft 3) and the swinging center (C) of the steering column 10 are different from each other, moving amount in a columnar axial direction will become different between the driving unit 4 (fixed to the tilt shaft 3) and the steering column 10. In order to cancel this difference, the elongated holes is formed on the fixing bracket 1 are set to provide their longer dimensions (longitudinal dimensions) extending in the axial direction of the steering column 10, so that the tilt shaft 3 is guided by the elongated holes is to move in response to a swinging motion of the crank member 4, and stop at positions as shown in FIGS. 5 and 6. As for means for supporting the tilt shaft 3 to be relatively movable to the fixing bracket 1 in the axial direction of the steering column 10, it may be so configured that elongated grooves (not shown) of the same configuration with the elongated holes is may be formed, in lieu of the elongated holes is, at the same positions thereof between the opposite side walls of the fixing bracket 1, and the opposite end portions of the tilt shaft 3 are slidably fitted into those elongated grooves.

Also, according to the present embodiment, as the steering column 10 is biased by the pair of the tension coil springs 5 so as to be held at the predetermined neutral position when the driving unit 4 is not actuated, the driving unit 4 is not required to compensate a load for lifting weight of the steering column 10 or the like, when the tilting operation is performed. Therefore, its driving force to be output can be reduced, comparing with an apparatus without the tension coil springs 5 being installed, whereby the electric motor 42 can be reduced in size, for example. Practically, in the case where the steering column 10 is moved toward its tilt-down side from the neutral position, as shown in FIG. 5, the steering column 10 is moved in such a direction that the tension coil springs 5 are extended, whereby the biasing forces of the tension coil springs 5 will be increased gradually. Therefore, the driving force to be output from the driving unit 4 will correspond to only the increased amount of the biasing force by the tension coil springs 5. On the contrary, in the case where the steering column 10 is moved toward its tilt-up side from the neutral position, as shown in FIG. 6, the steering column 10 is moved in such a direction that the tension coil springs 5 are shrunk, whereby the biasing forces of the tension coil springs 5 will be decreased gradually. Therefore, the driving force to be output from the driving unit 4 will correspond to only the decreased amount of the biasing forces by the tension coil springs 5.

Figure 7:
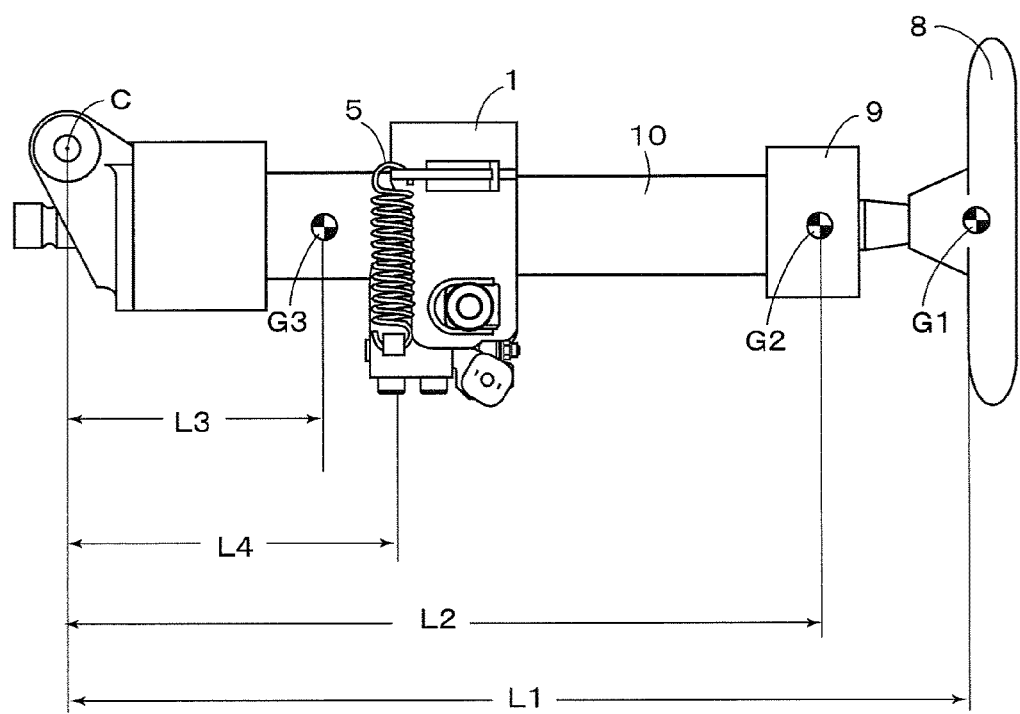
FIG. 7 is a side view of a steering apparatus to explain factors to be considered when a biasing force of a tension coil spring is set, according to an embodiment of the present invention.

FIG. 7 shows factors to be considered to set the biasing forces of the tension coil springs 5 as described above, which are set such that the biasing forces of the tension coil springs 5 are balanced with the weight of the parts of the steering column 10, steering wheel 8, combination switch 9 and the like, at the neutral position (tilt neutral position). For example, if mass of the steering wheel is set to be "M1", mass of the combination switch 9 is set to be "M2", mass of an assembly of the steering column 10 except for the upper bracket 1a is set to be "M3", distance from the tilting center (C) to a gravity center G1 of the steering wheel 8 is set to be "L1", distance from it to a gravity center G2 of the combination switch 9 is set to be "L2", distance from it to a gravity center G3 of the steering column 10 is set to be "L3", biasing forces of the tension coil springs 5 are set to be "F", and distance from the springs to the mounted position is set to be "L4", the biasing force "F" will be provided to fulfill;

$$(M1 \times L1 + M2 \times L2 + M3 \times L3) \times g = F \times L4$$

("g" indicates gravitational acceleration)
Furthermore, in the case where parts or the like of an electronic controlled power steering system (EPS) are installed, for example, the biasing force "F" will be provided to consider influences by them.

As the tension coil springs 5 with the biasing force "F" being provided as described above are mounted between the fixing bracket 1 and tilt bracket 2, the biasing forces of the tension coil springs 5 are balanced with their total weight at the neutral position of the steering column 10, thereby to provide such a state that no load is being applied to the tilt shaft 3. Therefore, the driving unit 4 is not required to compensate the load for lifting the weight of the steering column 10 or the like, when the tilting operation is performed, so that the electric motor 42 or speed reducer 50 can be reduced in size, comparing with the apparatus without the tension coil springs 5 being installed.

Particularly, with respect to characteristics of the tension coil springs 5, in the case where the apparatus is operated from the state at the neutral position to the tilt-up side, the lengths of the tension coil springs 5 will be reduced by the tilting operation, so that the biasing forces of the tension coil springs 5 will be reduced by (spring constant×changed amount of spring length). Therefore, the load is applied to the tilt shaft 3 by the reduced amount of the biasing forces. On the other hand, in the case where the apparatus is operated to the tilt-down side, the lengths of the tension coil springs 5 will be increased by the tilting operation, so that the biasing forces of (spring constant×changed amount of spring length) will be required. Therefore, in the case where the apparatus is operated from the neutral position to either of the tilt-up side and tilt-down side, thrust force (driving force) of [spring constant×changed amount of spring length] will be required. In this respect, by setting spring factors or installing dimensions of the tension coil springs 5 so as to provide spring constants to be as small as possible, provided that the balance with the weight as described above is maintained, the driving force required for the tilting operation can be minimized, so that a further reduction in size for the electric motor 42 or speed reducer 50, and cost down can be achieved.

Figure 8:
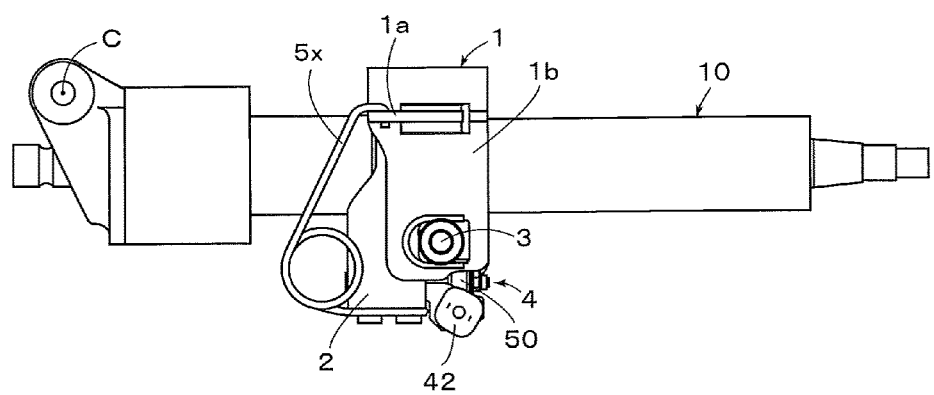
FIG. 8 is a side view of a steering apparatus according to another embodiment of the present invention.
Figure 9:
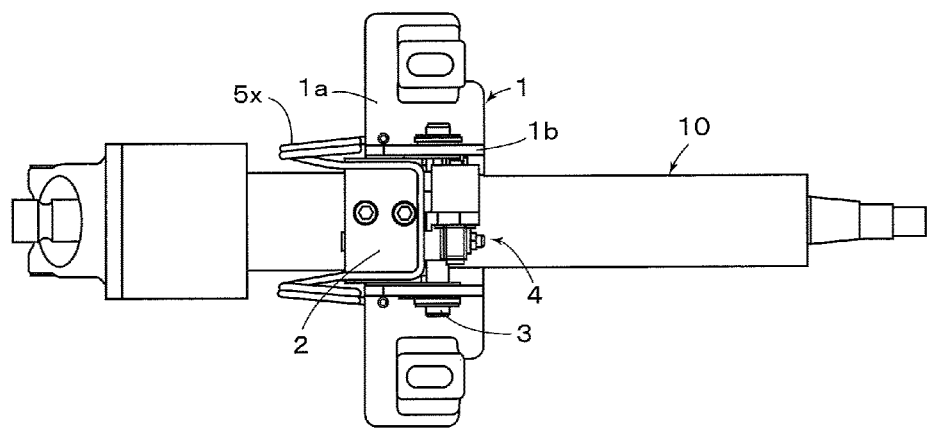
FIG. 9 is a bottom view of a steering apparatus according to another embodiment of the present invention.

FIGS. 8 and 9 show a steering apparatus 101 according to another embodiment of the present invention, where a single torsion coil spring 5x of double torsion type is employed as the biasing member, in lieu of the pair of tension coil springs 5 as described before. That is, opposite ends of the torsion coil spring 5x of double torsion type are engaged with the opposite ends of the upper bracket 1a configuring the fixing bracket 1, respectively, and its main body portion is engaged with the tilt bracket 2, to configure the biasing member by the torsion coil spring 5x of double torsion type, which biases the steering column 10 to be held at the predetermined neutral position (tilt neutral position), when the driving unit 4 is not actuated. Thus, as the biasing member can be configured by the single torsion coil spring 5x of double torsion type, a further reduction in size and cost down can be achieved. The tilt bracket 2 of the present embodiment is not required to provide engaging protuberances 2a, 2b as described before. As other components are the same as those shown in FIGS. 1-4, explanations about substantially the same parts are omitted herein by putting the same reference numerals.

Figure 10:
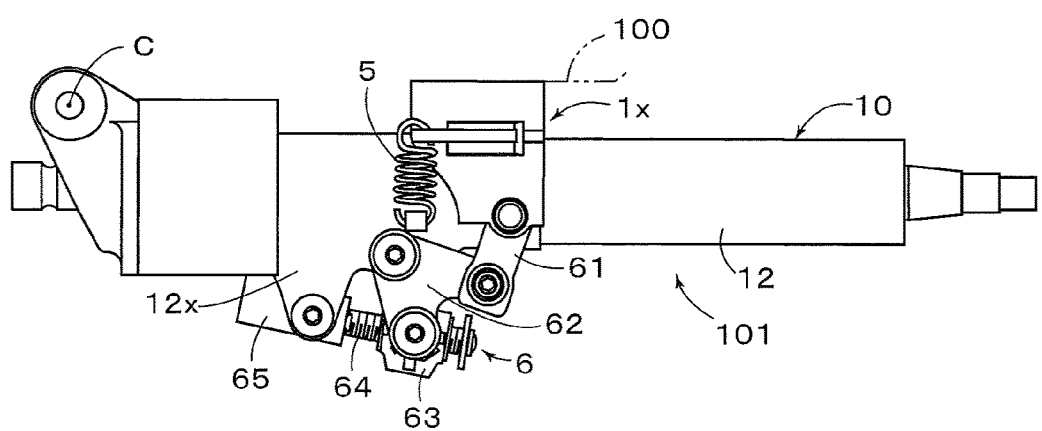
FIG. 10 is a side view of a steering apparatus according to a further embodiment of the present invention.

FIG. 10 relates to a further embodiment of the present invention, where brackets (represented by 12x) are integrally formed with left and right portions of the main tube 12 configuring the steering column 10, in a steering apparatus 101 having the same driving unit 6 as a prior electric motor tilt mechanism. That is, according to the present embodiment, one end portion of a first link 61 is supported on a lower portion of a fixing bracket 1x to be swingable, and its other end portion is supported on one end portion of a second link 62 to be swingable, a middle portion of the second link 62 is supported on a lower portion of a bracket 12x to be swingable, and the other end portion of the second link 62 is supported on a nut 63 to be swingable, so that a link mechanism is configured. As the nut 63 is meshed with a screw shaft 64, when the screw shaft 64 is rotated by an electric motor 65, the nut 63 is moved to act as a slider.

Then, one ends of the pair of tension coil springs 5 are engaged with the fixing bracket 1x, and their other ends are engaged with the bracket 12x, so that the biasing member is configured by those tension coil springs 5, which bias the steering column 10 to be held at the predetermined neutral position (tilt neutral position). Although the other ends of tension coil springs 5 may be directly engaged with the steering column 10 (main tube 12), they should be provided independently from lift-up tension coil springs (not shown) for use in a so-called lift-up mechanism, which bias the steering column to be lifted only upward of the vehicle body, so as to avoid being influenced by the lift-up tension coil springs.

According to the present embodiment, therefore, the tension coil springs 5 with biasing force thereof being provided as described above are mounted between the fixing bracket 1x and bracket 12x, the biasing forces of the tension coil springs 5 are balanced with total weight at the neutral position of the steering column 10, thereby to provide such a state that no load is being applied to the tilt shaft 3. Therefore, the driving unit 6 is not required to compensate the load for lifting the weight of the steering column 10 or the like, when the tilting operation is performed, whereby the electric motor 65 or the like can be reduced in size, comparing with the apparatus without the tension coil springs 5 being installed.

DESCRIPTION OF CHARACTERS

1,1x fixing bracket
1s elongated hole
2 tilt bracket
3 tilt shaft
4,6 driving unit
5 tension coil spring (biasing member)
5x torsion coil spring (biasing member)
10 steering column
41 crank member
42 electric motor
50 speed reducer
65 electric motor
100 vehicle body
101 steering apparatus

The invention claimed is:

1. A steering apparatus for a vehicle comprising:
a fixing bracket fixed to a vehicle body;
a steering column supported on the vehicle body to be swingable;
a driving unit adjusting a relative position of the steering column to the fixing bracket;
a biasing member having one end supported on the fixing bracket, and holding the steering column at a predetermined neutral position when the driving unit is not actuated;
a tilt bracket holding the steering column and supported on the fixing bracket to be relatively movable thereto; and
a tilt shaft extending in a lateral direction of the vehicle body and supported on the fixing bracket to be relatively movable thereto in an axial direction of the steering column,
wherein the steering column is adjusted to be placed at a tilt position with a desired tilt angle relative to the fixing bracket,
wherein the driving unit comprises a crank member having one end fixed to the tilt shaft, an electric motor fixed to the tilt bracket, and a speed reducer reducing an output of the electric motor and rotating the other end of the crank member, and
wherein the tilt bracket is rotated about an axis of the tilt shaft in response to rotation of the electric motor, to adjust a relative position of the tilt bracket to the fixing bracket.

2. A steering apparatus for a vehicle as claimed in claim 1, wherein the biasing member is a coil spring with one end thereof being engaged with the fixing bracket, and the other end thereof being engaged with at least one of the tilt bracket and the steering column.

3. A steering apparatus for a vehicle as claimed in claim 1, wherein the fixing bracket is formed with elongated holes having longer dimensions thereof extending in the axial direction of the steering column, and the tilt shaft is supported in the elongated holes to be relatively movable thereto.

4. A steering apparatus for a vehicle as claimed in claim 1, wherein the speed reducer comprises a first worm gear fixed to an output shaft of the electric motor, a first worm wheel meshed with the first worm gear, a second worm gear rotated integrally with the first worm wheel, and a second worm wheel meshed with the second worm gear, and wherein a rotation shaft of the second worm wheel is fixed to the other end of the crank member.

* * * * *